United States Patent
Ziffer

(10) Patent No.: US 11,206,769 B2
(45) Date of Patent: Dec. 28, 2021

(54) EXPANDABLE, CONFIGURABLE, DISASSEMBLABLE STRUCTURE FOR CREATING BARRIERS OR ENCLOSURES FOR LANDSCAPING

(71) Applicant: Amy Ziffer, Sherman, CT (US)

(72) Inventor: Amy Ziffer, Sherman, CT (US)

( * ) Notice: Subject to any disclaimer, the term of this patent is extended or adjusted under 35 U.S.C. 154(b) by 251 days.

(21) Appl. No.: 16/457,989

(22) Filed: Jun. 29, 2019

(65) Prior Publication Data
US 2020/0037515 A1 Feb. 6, 2020

Related U.S. Application Data

(60) Provisional application No. 62/714,651, filed on Aug. 3, 2018.

(51) Int. Cl.
| | | |
|---|---|---|
| A01G 13/02 | (2006.01) | |
| E04B 1/18 | (2006.01) | |
| E04B 1/19 | (2006.01) | |
| E04B 1/28 | (2006.01) | |
| E04B 1/24 | (2006.01) | |

(52) U.S. Cl.
CPC ............ *A01G 13/0237* (2013.01); *E04B 1/18* (2013.01); *E04B 1/19* (2013.01); *E04B 1/28* (2013.01); *E04B 1/2403* (2013.01)

(58) Field of Classification Search
None
See application file for complete search history.

(56) References Cited

U.S. PATENT DOCUMENTS

| | | | | |
|---|---|---|---|---|
| 4,630,550 A * | 12/1986 | Weitzman | ............... | A47B 13/06 108/155 |
| 4,842,035 A * | 6/1989 | Thompson | ............ | E04B 2/7431 160/135 |
| 5,010,909 A * | 4/1991 | Cleveland | ............. | E04H 15/001 135/119 |
| 5,125,206 A * | 6/1992 | Motohashi | ............... | B64G 9/00 52/646 |
| 5,230,197 A * | 7/1993 | Hart | .......................... | E04B 1/19 52/638 |
| 7,021,694 B1 * | 4/2006 | Roberts | ..................... | B60J 7/102 135/88.13 |
| 7,219,681 B1 * | 5/2007 | Hamilton-Jones | .... | E04H 15/322 135/119 |
| 8,671,644 B2 * | 3/2014 | Huang | ................... | A47B 13/06 52/653.2 |
| 8,851,144 B2 * | 10/2014 | Forbis | ..................... | E04C 2/384 160/135 |

(Continued)

*Primary Examiner* — Joshua K Ihezie
(74) *Attorney, Agent, or Firm* — Ziegler IP Law Group, LLC

(57) ABSTRACT

A frame includes a first frame assembly, where the first frame assembly includes an arm member having a first and second end, a leg member having a first and second end, a first fitting connecting the first end of the arm and leg members at an angle, and a flexible panel fastened to the arm and leg members. A method of building a frame includes assembling a first frame assembly by connecting a first end of an arm member having a first and second end with a first end of a leg member having a first and second end, at an angle using a first fitting, and fastening a first flexible panel to the arm and leg members.

15 Claims, 19 Drawing Sheets

(56) References Cited

U.S. PATENT DOCUMENTS

| | | | |
|---|---|---|---|
| 2002/0104987 A1* | 8/2002 | Purvis | E04G 21/3223 256/65.14 |
| 2002/0137598 A1* | 9/2002 | Publicover | A63B 5/11 482/27 |
| 2005/0016573 A1* | 1/2005 | Wu | E04H 15/64 135/98 |
| 2009/0239686 A1* | 9/2009 | Moos | A63B 69/0002 473/453 |
| 2011/0101728 A1* | 5/2011 | Bourcier | B60J 7/102 296/100.18 |
| 2012/0007343 A1* | 1/2012 | Webster | B62B 3/008 280/659 |

* cited by examiner

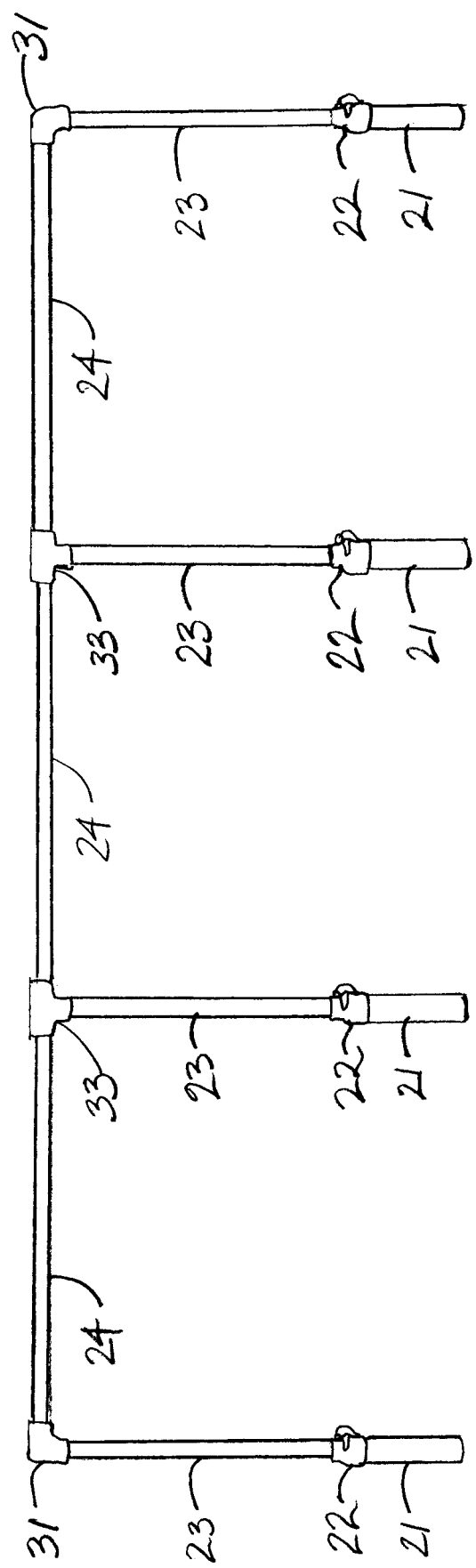

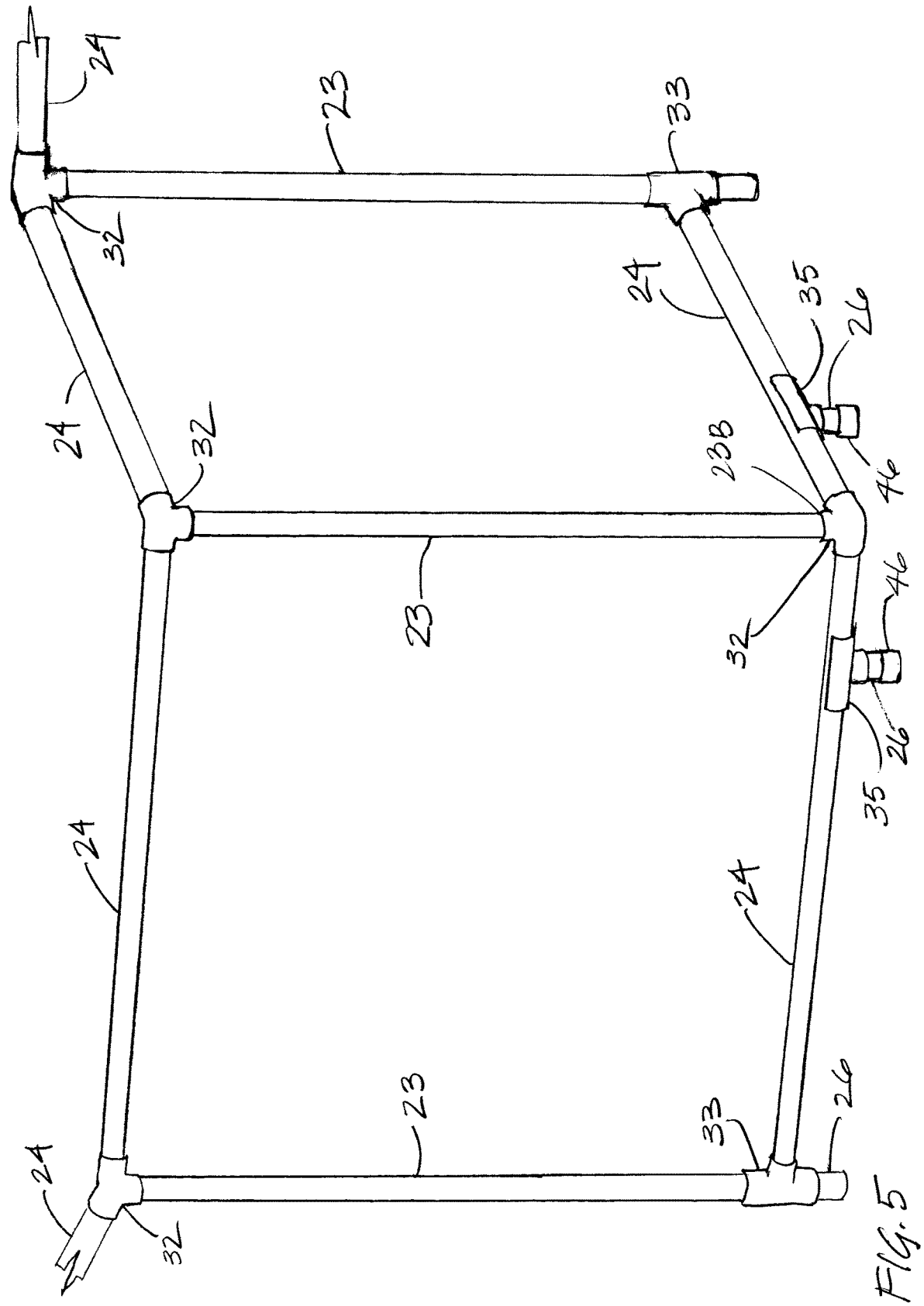

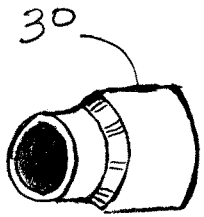
FIG. 6E
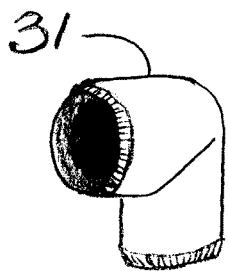
FIG. 6F
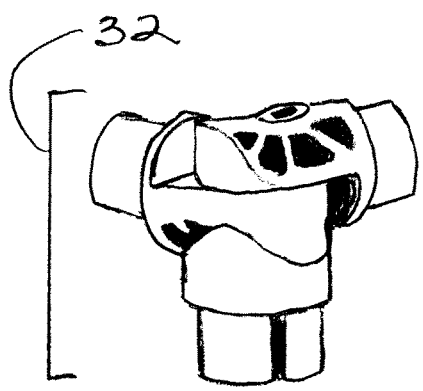
FIG. 6G
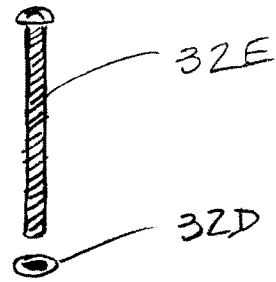
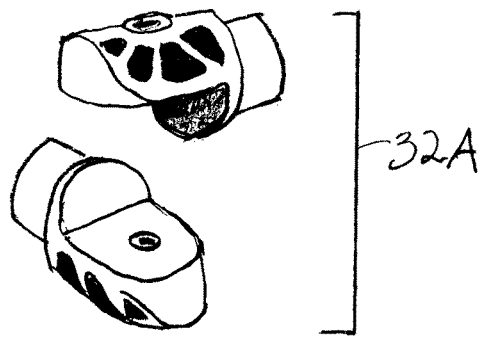
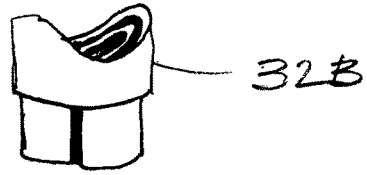
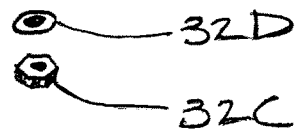
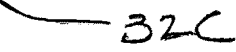
FIG. 6H

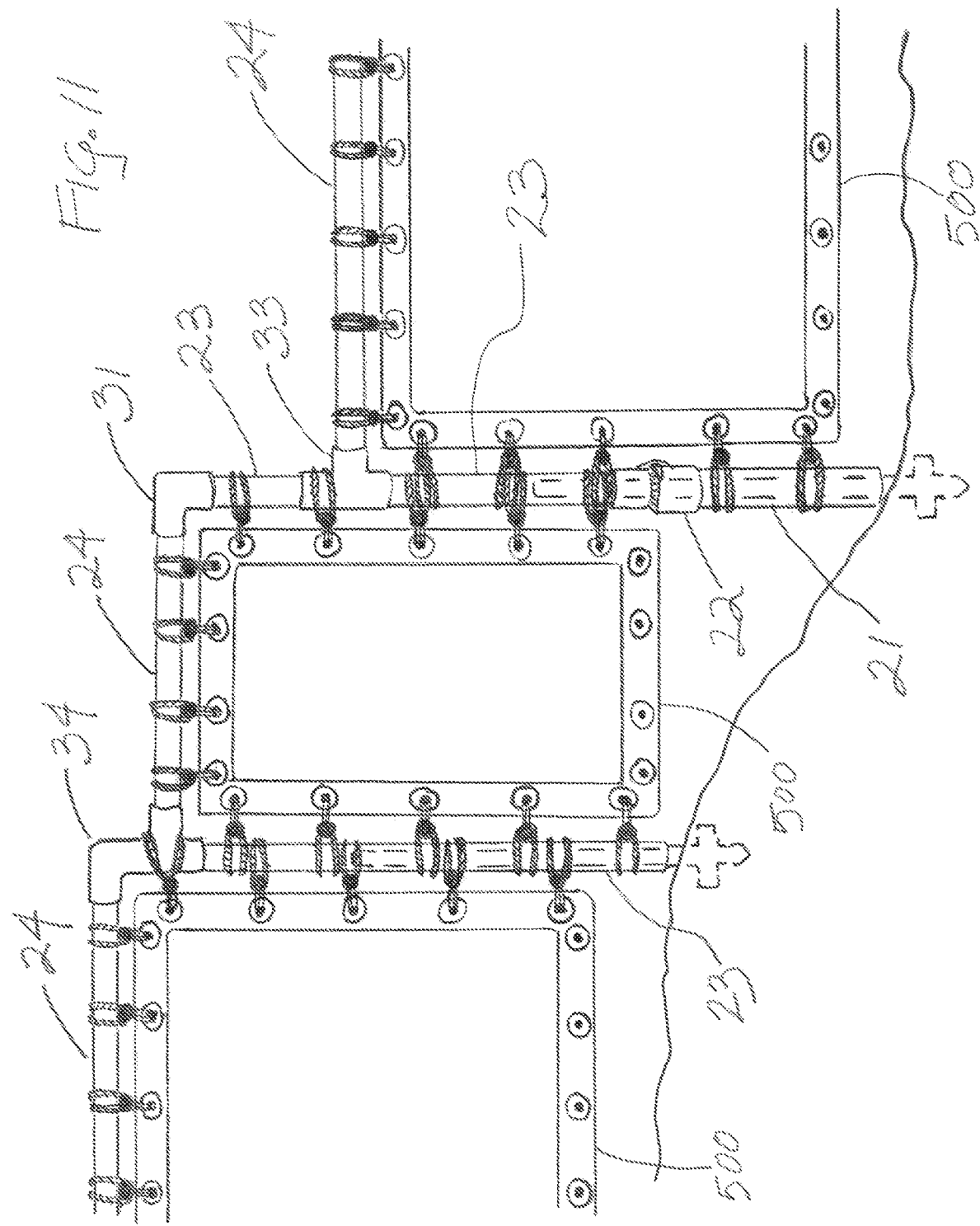

EXPANDABLE, CONFIGURABLE, DISASSEMBLABLE STRUCTURE FOR CREATING BARRIERS OR ENCLOSURES FOR LANDSCAPING

BACKGROUND

Field

The disclosed article of manufacture relates to the protection of woody plants (principally but not exclusively shrubs and trees) in landscapes against threats including but not limited to deer and other animal browsing; damage from snow-melt substances such as salt applied to roads, driveways, and walkways; wind damage; desiccation; mounding of snow by snow plows, snowblowers, and/or other snow removal devices; and other threats not enumerated.

More particularly, the disclosed embodiments offer substantial improvement over traditional methods of performing the same function, exhibiting greater efficacy, longevity, and attractiveness; adaptability to different landscape settings; adjustability in response to localized site conditions; cost-effectiveness over time; expandability as needed (for example, as a plant grows in size over the years); and ease of installation, breakdown, storage, and reinstallation as the seasons require. The general nature of the product does not limit its usefulness to plants in landscape settings but rather makes it a general-purpose barrier or enclosure for a wide range of applications.

Description of Related Art

Landscaping for ornamental, remedial, or other purposes in both residential and commercial settings is ubiquitous. Woody plants in landscape designs contribute an aesthetically desirable year-round presence, but their extant structure during the coldest months of the year also presents certain challenges. Inclement weather, predation by browsing animals such as deer, application of salt to roads in order to melt snow, plowing of roads in order to remove snow, and many other predictable and unpredictable events can all lead to damage of woody plants.

Most of the types of damage enumerated and implied here are limited to the bottommost 4-5 feet of woody plant growth. As such, protection against said damage is adequately and cost-effectively provided by a barrier or enclosure that surrounds or buffers but does not necessarily overtop the tree or shrub.

Historically, both homeowners and landscape professionals have resorted to haphazard contraptions of wooden or metal stakes and burlap, plastic netting, or plastic fencing of various types to protect woody plants from damage during the winter season and surrounding months. These methods suffer from several shortcomings.

First, some of the materials typically used exhibit poor longevity. Practically speaking, for most homeowners burlap is a "one and done" material that can only be used for a single winter season, making its purchase a recurring cost that must be borne annually. Securing burlap to stakes requires penetrating the fabric with staples, tie-wraps, or other fasteners, leading to unravelling of the material and its possible failure as a barrier. Many small animals that forage in the winter landscape readily gnaw burlap, creating unsightly holes in the fabric. Finally, burlap is not easily mended because of its open weave, so once damage occurs burlap is generally replaced rather than repaired.

Most grades of plastic netting and fencing also exhibit poor longevity. Those that have small openings catch on every available surface, including twigs and branches of the woody plants themselves, as well as tools and even buttons and items of clothing worn by the installer. This makes them prone to tearing, and it is impractical to mend them once they are damaged.

Second, the utility of plastic netting and fencing is extremely limited. These products can only provide protection against large animal browsing, but cannot provide effective protection against other kinds of damage.

Third, plastic netting and fencing products are also frustrating materials with which to work, leading many homeowners to discard them after one season. Heavy duty grades are stiff and difficult to fold or roll up, while lightweight grades are too springy to remain folded or rolled, making all grades of plastic netting and fencing difficult to store when they are not in use.

Fourth, because there is no standard system of gradation for most plastic netting and fencing products, there is considerable consumer confusion about the proper application(s) for any particular netting or fencing product. Homeowners frequently confuse inexpensive bird netting with more expensive deer fencing, using the former where the latter is required and thus inviting failure.

Fifth, one consequence of the lack of horizontal framing elements in traditional stake-and-burlap barriers is that any material attached to the vertical stakes tends to sag from lack of support between the stakes. Snow and ice can easily accumulate on such unsupported surfaces. This additional weight drags the material down and can rip it off its supports, causing failure of the structure.

Sixth, on occasion homeowners may attempt to protect woody plants using completely inappropriate materials such as tarpaulins or plastic sheeting, which are not air- or water-permeable. If fastened to upright supports such as stakes, they can act like a sail and be torn away by a stiff wind. If wrapped around a plant they can trap heat and "cook" a plant even if the ambient temperature is quite low. By blocking water from reaching the root zone, they may cause premature death of the plant.

Seventh, the materials surveyed thus far are not easily adapted to landscape situations where the ground slopes, as is frequently the case. In such a situation, vertical stakes of a variety of heights—unknowable to the installer prior to installation—may be needed in order to permit a continuous section of burlap or fencing to wrap around in a level manner. Even establishing level is difficult because there are no horizontal frame elements connecting the vertical stakes on which to establish a level line.

Eighth, the materials surveyed thus far do not readily accommodate plant growth from year to year. If a section of plastic netting or fencing is cut to enclose a tree or shrub this year, it may be too small to enclose it the following year. If one attempts to circumvent this issue by cutting the netting/fencing longer than needed in its first year of use, there is no good way to gather the excess during the first year of use.

In short, existing products all exhibit significant shortcomings both practical and aesthetic in nature. The disclosed article of manufacture was developed to address the need for a protective plant barrier or enclosure with superior longevity; expandability; ease of installation, disassembly, and storage; air- and water-permeability; pleasing aesthetics; and ability to conform to topographic contours and other irregularities in the landscape through adjustability in size, shape, and height.

SUMMARY

The use of frame elements with adjustability of height and length; a variety of fittings including variable-angle fittings; a variety of suitable flexible textile panels of variable, customizable lengths and heights; and a variety of possible anchoring methods permit the disclosed embodiments to be used to construct neat, attractive, and effective barriers or enclosures in sizes and shapes that are highly conformable to site conditions and other conditions, a result not easily obtainable with conventional materials or methods. A barrier or enclosure so constructed also has wide application beyond the fields of landscaping and horticulture.

The disclosed article of manufacture comprises a flexible panel or multiple flexible panels that may be principally of textile composition (hereafter "textile panel" or "textile panels"), suspended from, stretched over, mounted on, and/or supported by a frame of interconnecting pipe or tubing and fittings. The frame has both vertical leg and horizontal arm elements that exhibit, within limits, a degree of telescoping action or other devices that provide adjustability in height and in side length.

The frame is modular in the sense that each basic frame assembly (consisting of a leg, an arm, and a fitting or fittings connecting said leg and said arm) may interconnect with an adjacent frame assembly, and frame assemblies can be so interconnected for as great a distance as is required.

Additional frame elements may be employed in order to configure the frame in a manner required for a particular application. For example, additional horizontal frame elements and fittings may permit a leg to be "free floating" without a dedicated anchor point such as a post or bollard. The method for configuring a free-floating leg is described below.

Both fixed-angle, variable-angle, and accessory fittings (including but not limited to standard tees, standard elbows, offset tees, variable-angle tees, fishmouth adapters, telescoping bushings, inside and outside couples, reducers, snap clamps, lever-operated clamps, and others) may be employed as needed in order to interconnect or support frame assemblies or to create the size or shape of barrier or enclosure required.

The textile panel may be finished along its perimeter with binding tape penetrated at intervals by grommets. One manner of attaching a textile panel to a frame is through the use of a device commonly called a "bungee ball" (or sometimes, "ball bungee"), consisting of a loop of elastic shock cord fed through a hole in a hard plastic ball and securely tied off. The elastic loop of the bungee ball may be fed through a grommet in a textile panel, looped around an arm or a leg of a frame, and then looped around the ball component of the bungee ball, which is larger in diameter than the inside diameter of the grommet. A properly sized bungee ball will thereby provide the proper tension to secure a textile panel to a frame.

The length or height of a textile panel can also be adjusted, within limits, through various means. For example, a gathering device may be employed to make a textile panel fit a particular length or perimeter desired. A gathering device may be a length of elastic shock cord with the ball of a bungee ball at one end and a cord lock at the other, the whole cord-and-ball-and-lock assembly running through a series of grommets along a horizontal edge of a textile panel. The textile panel may then be gathered and made sufficiently taut by pulling the necessary length of cord through the cord lock and using the lock to secure the cord at the desired position. Gathering the textile panel identically along the top and bottom edges will cause it to bunch up, reducing its length without affecting its ability to be secured to the frame elements.

The adjustability of the frame elements, described earlier, permits the textile panel(s) to hang level around the enclosure or along the barrier. Multiple panels may be used in sequence for large enclosures or long barriers.

A frame may be rendered stationary in its environment in a multitude of ways according to the requirements of the site and the application. For example, when penetrable soil underlies the location where the barrier or enclosure is to be installed, properly proportioned metal u-posts, or any properly proportioned rigid objects that can function as posts, may be sunk into the ground to provide stationary anchor points for legs, which may slide over the anchor posts; thereby the rigidity of the anchor posts may be imparted to the legs. As another example of how a leg of a frame may be rendered stationary, an additional length of tubing may be coupled to the bottom of said leg for insertion into a ground sleeve.

If penetrable soil does not underlie the location where the barrier or enclosure is to be installed, or when immovability of the barrier or enclosure is not a requirement, anchoring may be accomplished with properly proportioned bollards with weighted bases.

Importantly, not every leg absolutely requires an anchor point; tension of a taut textile panel on a frame in conjunction with supplemental horizontal frame elements and fittings near ground level to either side of an unsupported leg can permit said unsupported leg to "float" between two solidly anchored legs, especially if the free-floating leg is properly angled with respect to the adjacent legs and if either fixed-length horizontal frame elements connect the free-floating leg to adjacent legs or telescoping horizontal frame elements that connect the free-floating leg to adjacent legs are used at their minimum length (that is, their fully retracted setting).

The disclosed article of manufacture is an improvement over existing methods of constructing barriers and enclosures in that a) the frame is limitlessly expandable by virtue of the modularity of its elements in order to accommodate (as one example) plant growth from year to year, or in response to other environmental changes or application demands; b) the frame is configurable in a continuous manner in that variable-angle fittings permit adjacent frame assemblies to form any angle, within a wide range, with respect to adjacent frame assemblies; c) the frame is further configurable in that both vertical and horizontal frame elements may exhibit variable height and length, respectively, permitting conformity to site conditions such as, for example, sloping ground; d) the frame is disassemblable in that frame elements are, by and large, not permanently attached by glue, hardware, or other means, which permits frame elements to be broken down quickly and stored compactly when not in use; e) the textile panel is permeable to air and water while (depending on the material employed) effectively blocking access by browsing animals; drifting snow; snow thrown by a snowblower; a significant amount of salt spray, wind and windblown particulate matter; and/or other hazards to plants or other objects that may be sheltered by the barrier or enclosure; f) the degree of protection against various hazards can be varied through appropriate selection of the principal panel material; g) the textile panel is designed to be attached to the frame elements in a non-damaging manner, without the use of fasteners that penetrate the panel except where such penetration is a design element and grommets exist for that purpose or provision is made for other modes of attachment; and h) the textile panel is easily removed from the frame elements and can be folded flat, rolled up, or otherwise easily stored.

The adjustability of the plurality of the structure's components and the flexibility of anchoring methods, as described above, permits the creation of irregularly shaped barriers or enclosures, which is desirable in order to accommodate odd-shaped plants; rocky soils or other sub-grade irregularities that preclude the use of regularly spaced vertical supports; sloping or otherwise irregular soil surface contours; constraints introduced by nearby structures such as houses or sheds; and other limiting circumstances.

In at least one aspect, the disclosed embodiments are directed to a frame including a first frame assembly, the first frame assembly including an arm member having a first and second end, a leg member having a first and second end, a first fitting connecting the first end of the arm and leg members at an angle, and a flexible panel fastened to the arm and leg members.

In at least one other aspect, the disclosed embodiments are directed to a method of building a frame including assembling a first frame assembly by connecting a first end of an arm member having a first and second end with a first end of a leg member having a first and second end, at an angle using a first fitting, and fastening a first flexible panel to the arm and leg members.

BRIEF DESCRIPTION OF THE DRAWINGS

Some aspects of the disclosed article of manufacture are illustrated as an example and are not limited by the figures of the accompanying drawings, in which like references may indicate similar elements, and in which:

FIG. 1B depicts an exploded perspective view of a second configuration of a leg of a frame;

FIG. 4A depicts an elevation view of an expression of modularity of a frame, consisting of a series of interconnecting basic frame assemblies and a terminating leg and fitting, the whole being configured as a barrier;

FIG. 5 depicts a perspective view of an expression of a free-floating leg;

FIGS. 6A through 6K depict views of a selection of fittings that may be used within and to interconnect basic frame assemblies; the selection shown in no way limits the use of other fittings not pictured here. The figures are as follows:

FIG. 6A depicts a perspective view of a right-angle 3-way tee fitting;

FIG. 6B depicts a perspective view of an outside couple fitting;

FIG. 6C depicts a perspective view of a telescoping fitting;

FIG. 6D depicts an alternative perspective view of a telescoping fitting;

FIG. 6E depicts a perspective view of a reducer couple fitting;

FIG. 6F depicts a perspective view of a standard right-angle elbow fitting;

FIG. 6G depicts a perspective view of a variable-angle 3-way tee fitting;

FIG. 6H depicts an exploded view of a variable-angle 3-way tee fitting;

FIG. 6I depicts a perspective view of a standard tee fitting;

FIG. 6J depicts a perspective view of an offset tee fitting;

FIG. 6K depicts a perspective view of a snap clamp fitting and end cap;

FIG. 11 depicts a plurality of interconnected frame assemblies, each frame assembly including an arm member having a first and second end and extending horizontally and a leg member having a variable height, a first end, and a second end with no connection to another leg member second end, providing conformity to irregular surface contours.

DETAILED DESCRIPTION

Figure 1A:
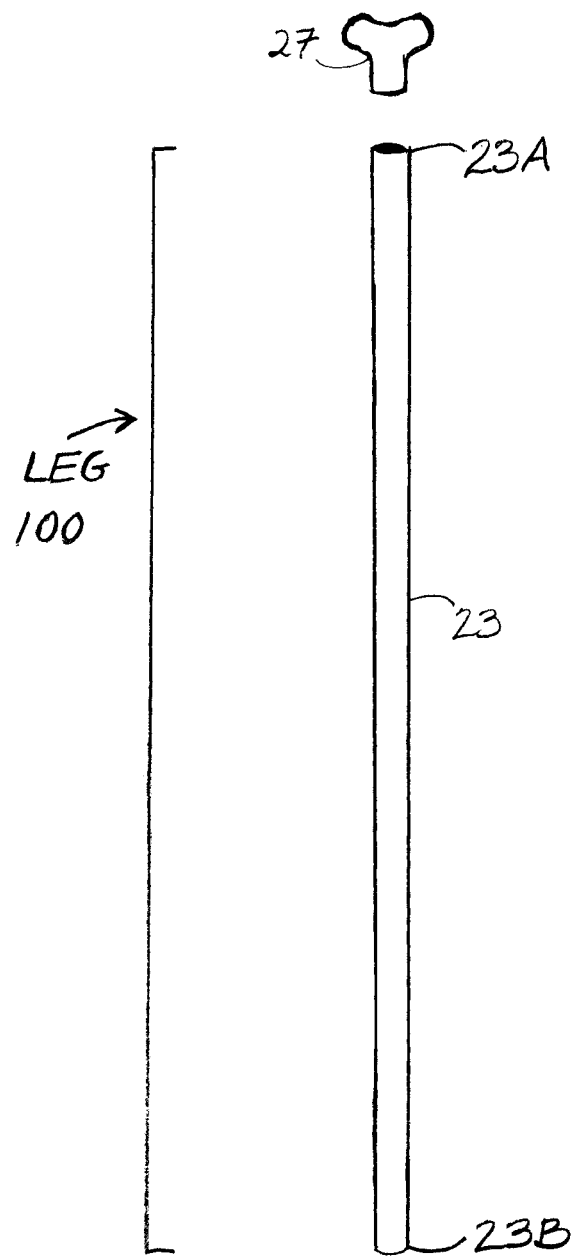
FIG. 1A depicts an exploded perspective view of a first configuration of a leg of a frame.

The terminology used herein is for the purpose of describing the disclosed embodiments only and is not intended to limit alternative embodiments. As used herein, the term "and/or" includes any and all combinations of one or more of the associated listed items. As used herein, the singular forms "a," "an," and "the" are intended to include the plural forms as well as the singular forms, unless the context clearly indicates otherwise.

It will be further understood that the terms "comprise," "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms used herein, including technical and scientific terms, have the same meaning as commonly understood by one having ordinary skill in the art to which the disclosed embodiments belong. It will be further understood that terms such as those defined in commonly used dictionaries should be interpreted as having a meaning that is consistent with their meaning in the context of the relevant art and the present disclosures and will not be interpreted in an idealized or overly formal sense unless expressly so defined herein.

In describing the disclosed embodiments, it will be understood that a number of techniques and steps are disclosed.

Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosed embodiments and the claims.

New barrier and enclosure devices, and methods for installing said devices, are discussed herein. In the following description, for purposes of explanation, numerous specific details are set forth in order to provide a thorough understanding of the disclosed embodiments. It will be evident, however, to one skilled in the art that the disclosed embodiments may be practiced without these specific details.

The disclosed embodiments are to be considered as examples of a more generalized device, and are not intended to limit the device to any specific embodiment illustrated by the figures or the description that follows.

The components of the disclosed embodiments fall into several groups, including but not limited to vertical and horizontal elements of a frame; fittings (including but not limited to clamps) that interconnect the vertical and horizontal frame elements; and elements of a textile panel or multiple textile panels along with devices for attaching said textile panel or panels to a frame and devices for adjusting the height or length of the panel or panels.

A frame consists of vertical and horizontal spans of pipe, tubing, rods, wire, extrusions, growths, or forms fashioned from growths, connected with a variety of compatible fittings. Although henceforth said spans may be referred to as "pipe" or "tubing," words such as "pipe," "tube" and "tubing" are to be interpreted to mean any structural element that offers the same functionality as the pipe or tubing referenced in the disclosed embodiments.

In the disclosed embodiments, the horizontal and vertical spans, as well as the plurality of the fittings, are manufactured from furniture-grade polyvinyl chloride ("FG-PVC"). However, said spans and fittings may be made from any suitable material or combination of materials including but not limited to PVC or any other polymer, anodized aluminum, metal or metal alloy, fiberglass, carbon fiber, composite of any combination of natural and synthetic materials, bamboo, wood, or any other material that permits the same functionality as the disclosed embodiments.

Figure 3:
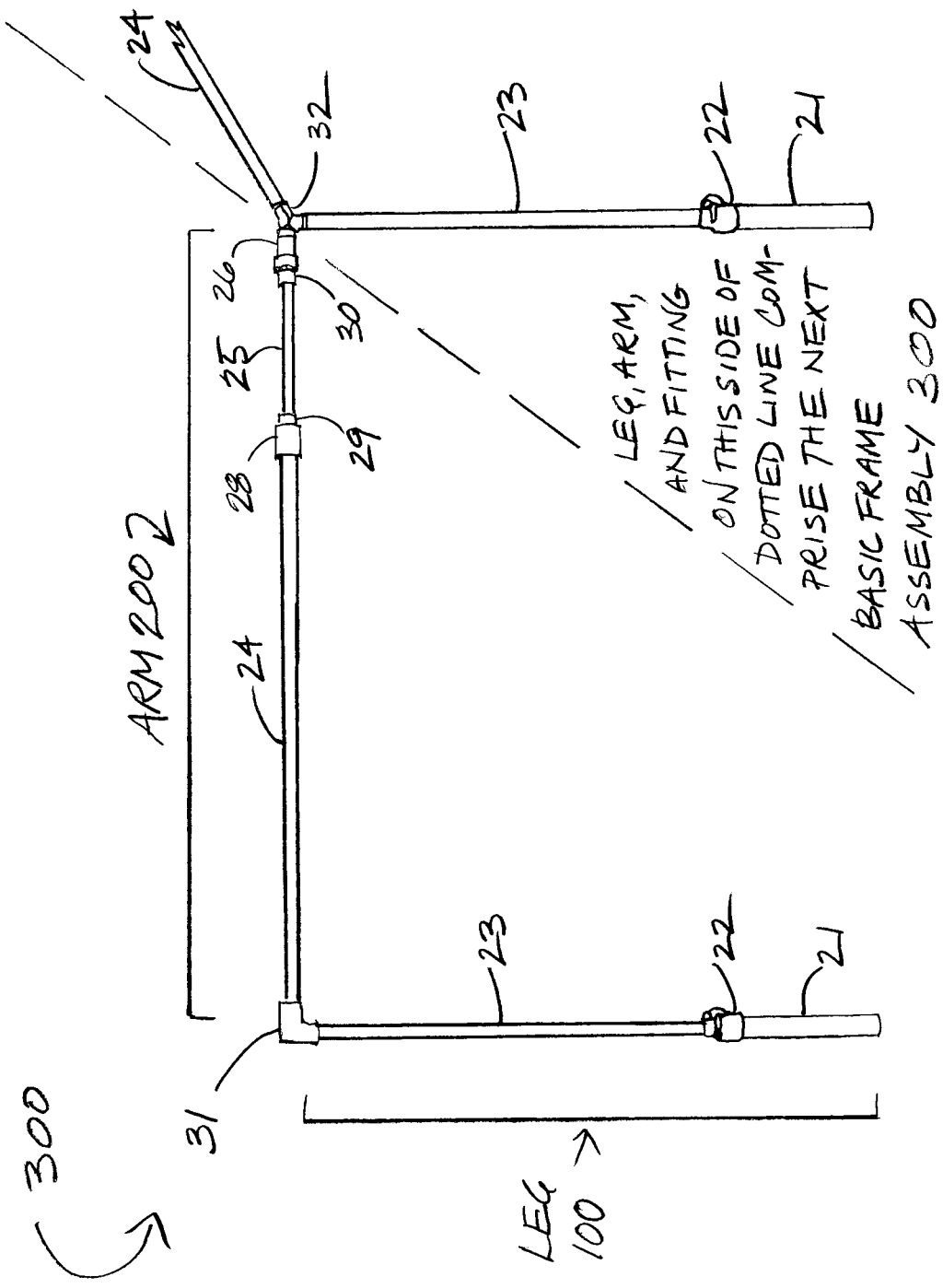
FIG. 3 depicts an elevation view of a configuration of a first basic frame assembly consisting of a leg element and an arm element and a fitting and the manner by which said first basic frame assembly interconnects with a second basic frame assembly.
Figure 4B:
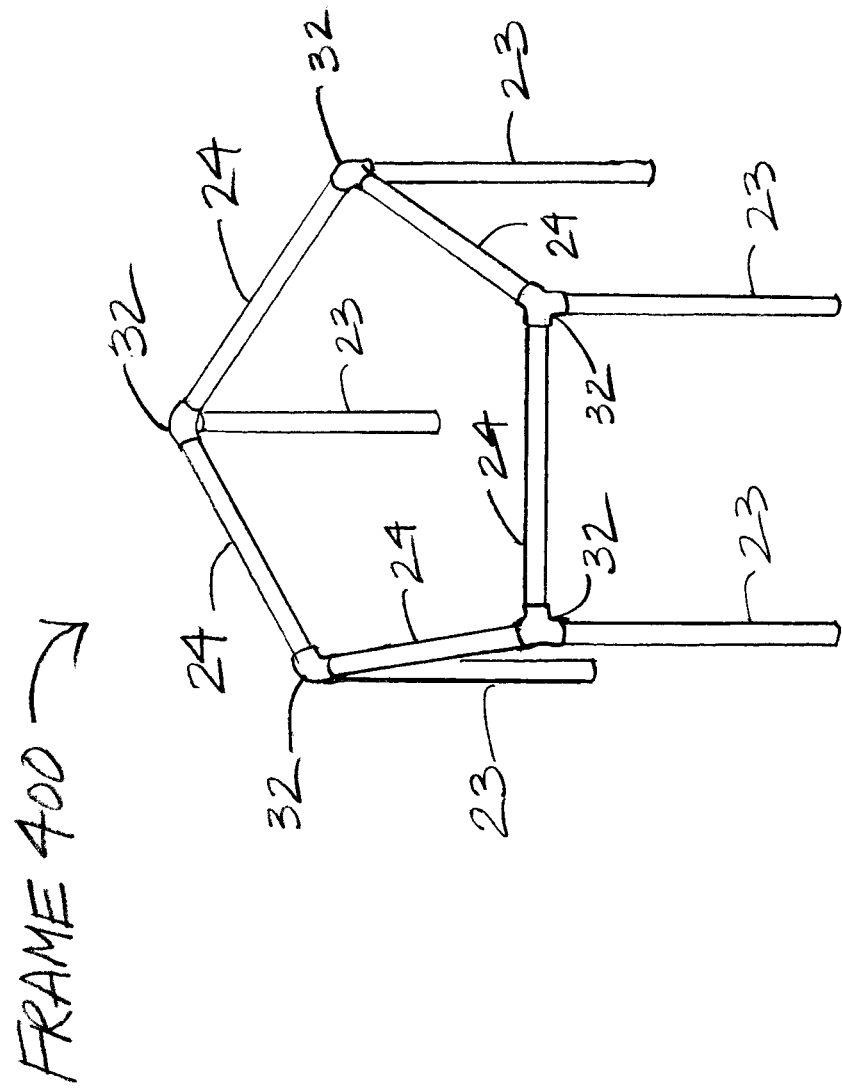
FIG. 4B depicts a perspective view of an expression of modularity of a frame, consisting of a series of interconnecting basic frame assemblies, the whole being configured as an enclosure.

The disclosed embodiments will now be described by referencing the appended figures. The following describes what could be considered a basic frame assembly 300 (FIG. 3) that can repeat linearly to build as large or long a frame 400 (FIGS. 4A and 4B) as is necessary for the application at hand, whether said frame 400 is configured as an enclosure or as a barrier or in some other configuration.

Figure 6A:
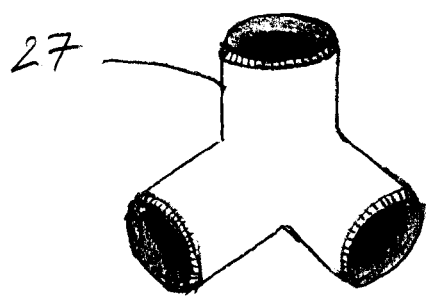
Figure 6B:
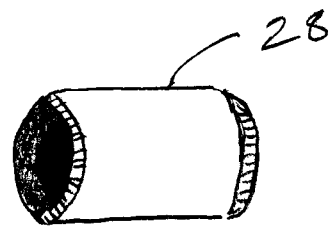
Figure 6C:
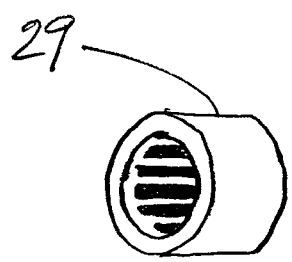
Figure 6D:
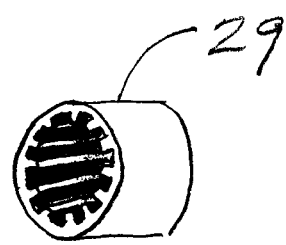
Figure 6I:
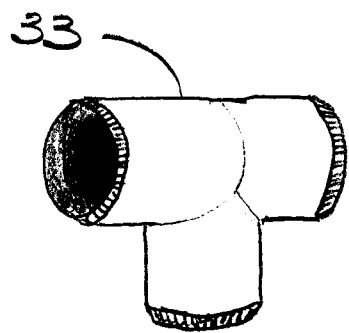
Figure 6K:
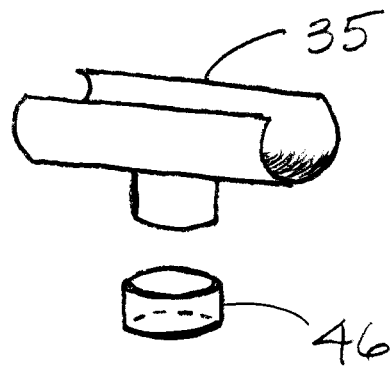
Figure 6J:
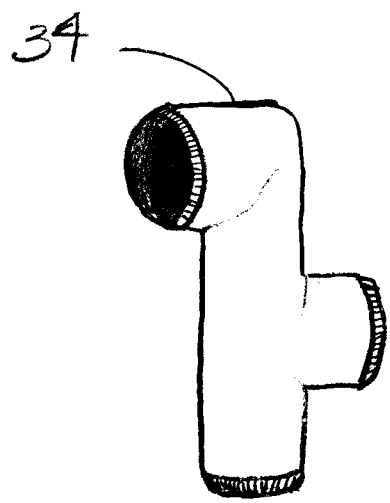

Each basic frame assembly comprises a leg member 100 or "leg" (FIGS. 1A and 1B), an arm member 200 or "arm" (FIGS. 2A, 2B, and 2C), and any of a range of possible compatible fittings (FIGS. 6A through 6K) including but not limited to a variable-angle three-way tee 32 (FIG. 6G), standard right-angle elbow 31 (FIG. 6F), standard tee 33 (FIG. 6I), or offset tee 34 (FIG. 6J).

Each leg 100 of a basic frame assembly 300 comprises a vertical span of tubing 23 (FIGS. 1A and 1B) which is configured to accept a compatible fitting or combination of fittings on one end 23A. The end of a vertical span so configured 23A will then function as the top of a leg 100 within an assembly 300. If no adjustability of height is desired in a leg 100, the aforementioned vertical span of tubing 23 comprises a leg 100.

In embodiments where adjustability of height is desired in a leg 100, an end 23B (FIG. 1B) of a vertical span 23 may be accepted by a clamp 22 (FIG. 1B), which in turn accepts a short span of tubing 21 (FIG. 1B) having such cross-sectional dimensions, larger than those of a vertical span 23, so as to allow telescoping of a vertical span 23 inside a wider span 21. The bottom end 21B (FIG. 1B) of a short span so configured will then function as the bottom or foot of a leg within an assembly. A clamp 22 secures the two spans of tubing 23 and 21 at the desired position relative to one another so as to provide the height adjustability necessary, within limits, for any given installation.

In the disclosed embodiments, the vertical span of tubing 23 may be a length of 1¼" Schedule 40 FG-PVC circular pipe having an outside diameter of approximately 1.6 inches. The shorter, wider span of tubing 21 may be a length of 1½' FG-PVC circular thin-wall pipe having a custom wall thickness of approximately 0.108 inches and an inside diameter of approximately 1.684 inches.

In the disclosed embodiments, a representative compatible fitting at the top 23A of a leg 100 may be a 1-¼" inside coupling variable-angle three-way tee 32 (FIG. 6G), comprising a variable-angle elbow 32A attached to a fishmouth adapter 32B with suitable hardware (FIG. 6H). Said hardware may comprise a 10/24 stainless steel stop nut 32C, a 10/24×2-½" stainless steel bolt 32E, and #10 stainless steel flat washers 32D.

A locking clamp 22 (FIG. 1B) may be of any design that can secure the abovementioned telescoping pipes 23 and 21 in position relative to one another when the desired height adjustment in a leg 100 is obtained, including but not limited to any suitable design of lever lock, twist lock, or collet lock. Instead of a clamp 22 the locking function may also be accomplished by any other suitable mechanism. A locking clamp 22 may be made from any suitable material including but not limited to nylon, PVC, any other polymer or plastic material, metal, metal alloy, carbon fiber, laminate, or composite of natural and/or synthetic materials that provides the necessary functionality. The disclosed embodiments employ UV-resistant nylon clamps that tighten by engaging a bar-type lever.

Each arm 200 (FIGS. 2A, 2B, and 2C) comprises a horizontal span of tubing 24, which is configured to accept a compatible fitting on one end 24A that may connect it to the top of a leg 100 (that is, it may accept the same fitting that is used at the top of said leg). If no adjustability of length is desired in an arm, a horizontal span of tubing 24 comprises an arm 200.

If adjustability of length is desired in an arm 200, an end 46A (FIG. 2B) of a horizontal span of tubing 46, having such cross-sectional dimensions that its outside diameter is slightly smaller than the inside diameter of a horizontal span of tubing 24, passes through an end 24B (FIG. 2B) of said horizontal span of tubing 24 such that said horizontal span of tubing 46 telescopes inside said horizontal span of tubing 24.

Figure 2B:
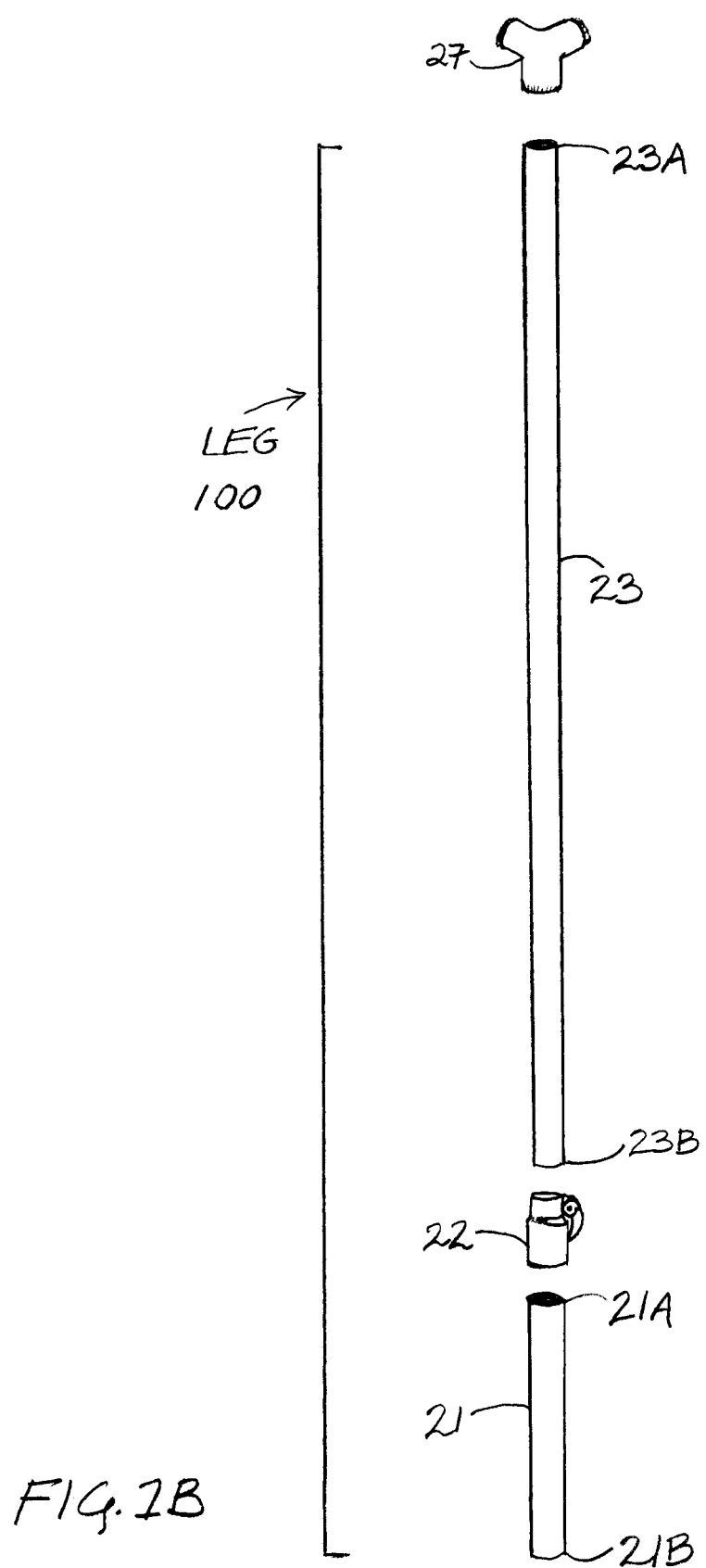
FIG. 2B depicts an exploded perspective view of a second configuration of an arm of a frame.
Figure 2A:
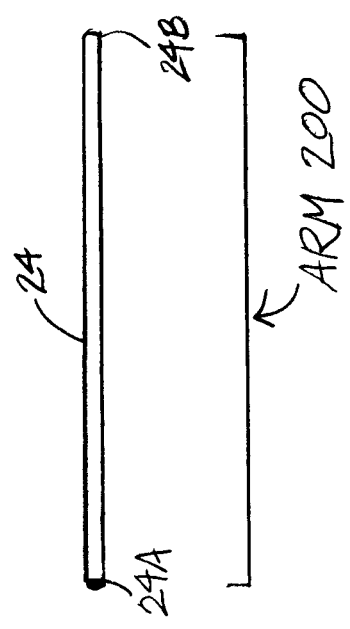
FIG. 2A depicts an exploded perspective view of a first configuration of an arm of a frame.
Figure 2B:
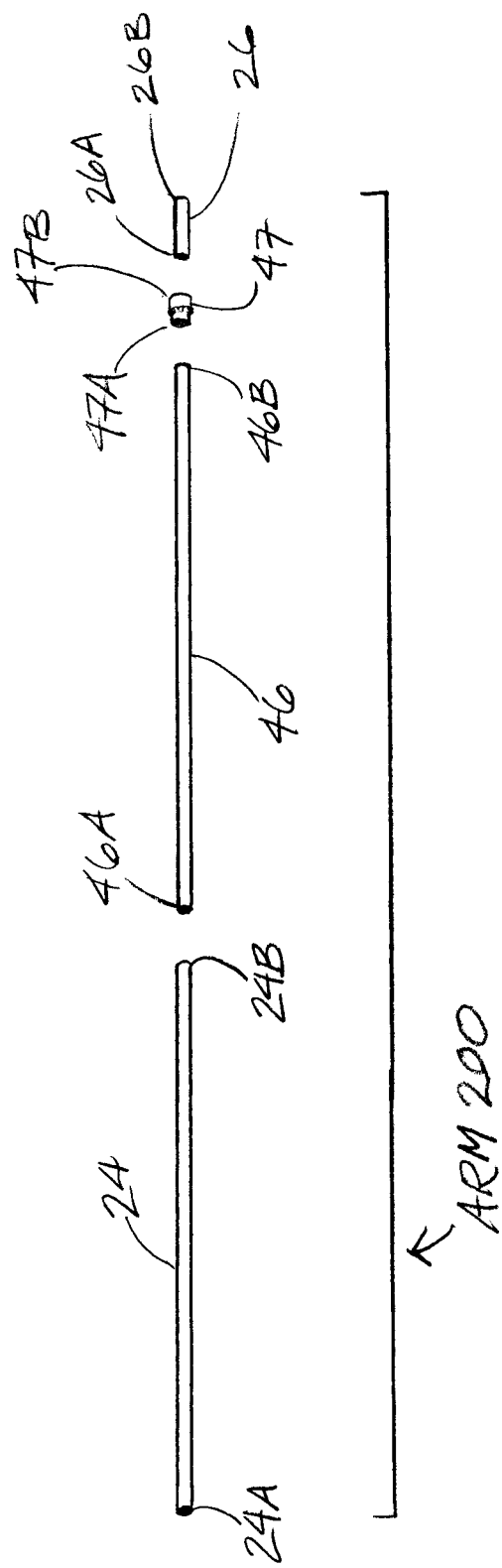

The end 46B of said smaller telescoping tube 46 that does not pass through said larger telescoping tube 24 is configured to accept a fitting commonly called a slip-socket reducer couple 47 (FIG. 2B). An end 47B of the reducer couple 47 accepts a span of tubing 26 having the same outside diameter as the larger of the two telescoping tubes in the arm. In the disclosed embodiment of FIG. 2B said larger tube is the horizontal span of tubing 24. Said span of tubing 26 is of indeterminate length and may be cut to size as the application requires.

Figure 2C:
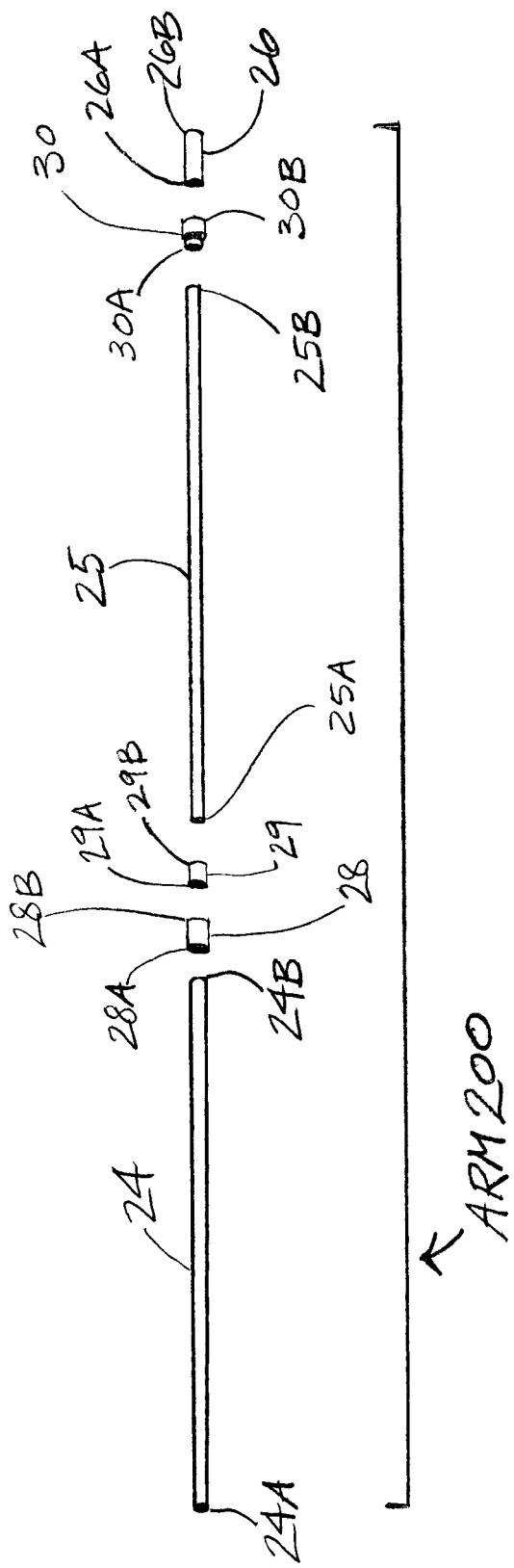
FIG. 2C depicts an exploded perspective view of a third configuration of an arm of a frame.

In an alternative embodiment (FIG. 2C) of an arm 200, an end 24B of a horizontal span of tubing 24 is configured to accept an outside couple 28 (FIG. 2C). An end 28B of said couple 28 is configured to accept a fitting commonly called a telescoping bushing 29. Through the telescoping bushing 29 passes a length of tubing 25, having such cross-sectional dimensions that its outside diameter is slightly smaller than the inside diameter of said telescoping bushing 29. In this manner the smaller diameter tube 25 telescopes inside the larger diameter tube 24.

In the alternative embodiment of an arm 200 of FIG. 2C, an end 25B of the telescoping tube 25 is configured to accept a fitting commonly called a slip-socket reducer couple 30. An end 30B of said reducer couple accepts a span of tubing 26 having the same diameter as the larger of the two telescoping tubes in the arm. In the disclosed embodiment of FIG. 2C said larger tube is the horizontal span of tubing 24. Said span of tubing 26 is of indeterminate length and may be cut to size as the application requires.

Said short span of tubing 26 at an end of an arm 200 is configured to accept a compatible fitting such as those described earlier and illustrated among FIGS. 6A-6K. Said fitting is part of the next basic frame assembly 300, providing the means by which the frame assemblies 300 connect in series to create a frame 400 (FIGS. 4A and 4B), which may be configured as a barrier (FIG. 4A) or enclosure (FIG. 4B) or in another configuration. As many of these assemblies 300 as are needed can be connected in series to build the desired barrier or enclosure.

An enclosure (FIG. 4B) is effected by having the arm of the last basic frame assembly accept an aspect of the same fitting as the first basic frame assembly, resulting in the entire structure closing back on itself. A barrier (FIG. 4A) is effected by having the arm of the last basic frame assembly accept a terminal fitting such as a standard elbow 31, which then accepts a leg 100, terminating the barrier. Any such barrier or enclosure so configured, per its respective description, regardless of the number of frame assemblies that comprise it, as well as any other functional configuration of frame assemblies, shall hereafter be referred to as a frame 400.

In the disclosed embodiments, a span of tubing 24 is comprised of 1-¼" Schedule 40 FG-PVC circular pipe, a span of tubing 46 is comprised of 1" Schedule 40 FG-PVC circular pipe; a span of tubing 25 is comprised of ¾" Schedule 40 FG-PVC circular pipe; an outside couple 28 is a 1-¼" outside couple; a telescoping bushing 29 is a 1-¼"×¾" telescoping bushing; a reducer couple 47 is a 1" to 1-¼" reducer couple; and a reducer couple 30 is a ¾" to 1-¼" reducer couple.

Figure 8A:
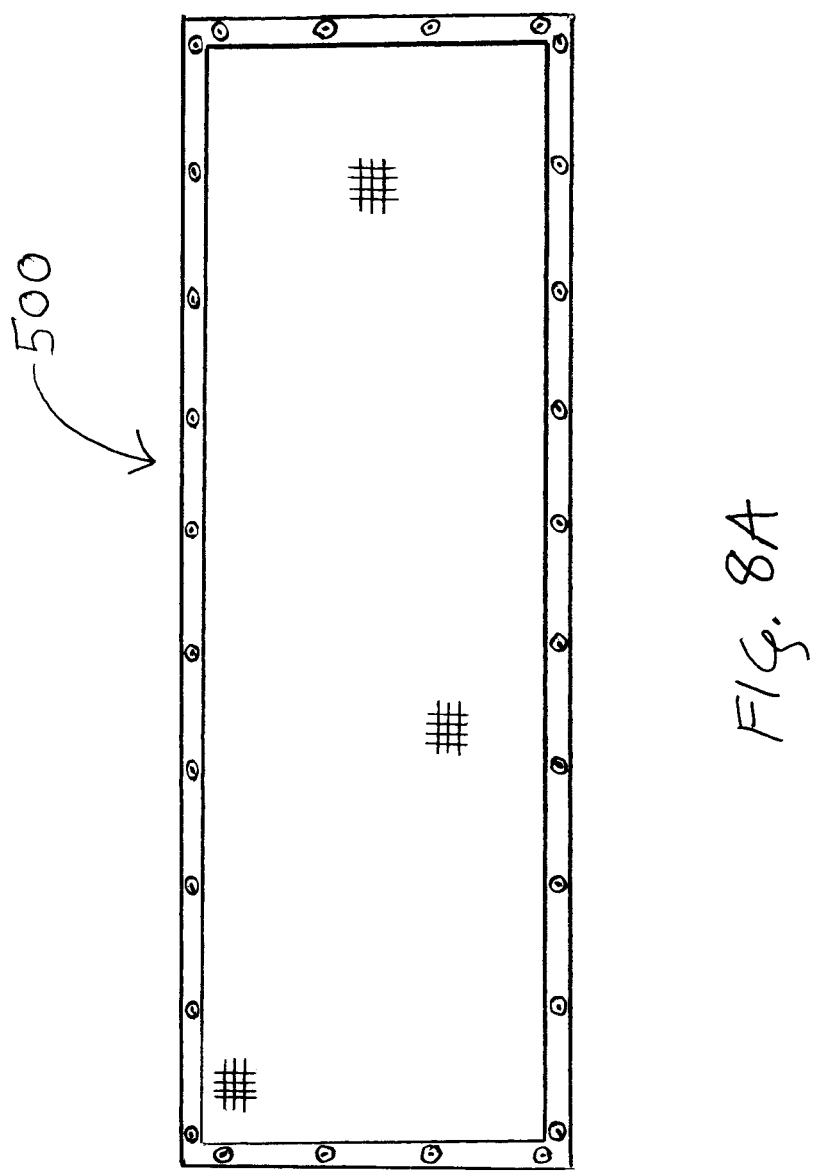
FIG. 8A depicts an elevation view of a textile panel.

In the disclosed embodiments, suspended from and supported by a frame 400 is a textile panel 500 (FIG. 8A) or a series of panels, generally of such dimensions as to fit within the planar space defined by the desired number of basic frame assemblies 300 that comprise a frame 400.

The textile components of a textile panel 500 may be made from any material type suitable to the purpose, including but not limited to knitted, woven, bonded, spun-bonded, netted, felted, braided, or laminated cloths, fabrics, tapes, bindings, or membranes. Said cloths, fabrics, tapes, bindings or membranes may be made from any synthetic or natural thread, fiber, yarn, filament, solution, strand, or mass. A panel may employ origami folding patterns and/or may have been treated or processed in ways that impart bi-stability, tri-stability, or other multiple energetic states to a panel such that mechanical, optical, or other stimuli result in autodeployment, auto-storage, or other purposeful movement of said panel.

A panel may be customizable in ways that enhance its functionality or decorative appeal. For example, a panel may come in a variety of colors and patterns; a panel may have been treated or processed in ways that impart luminescence; a panel may display a stock message or customer-defined message; or a panel may be configured in such a manner as to permit attachment or insertion of rope lighting or other lighting or other functional or decorative accessories.

Figure 8B:
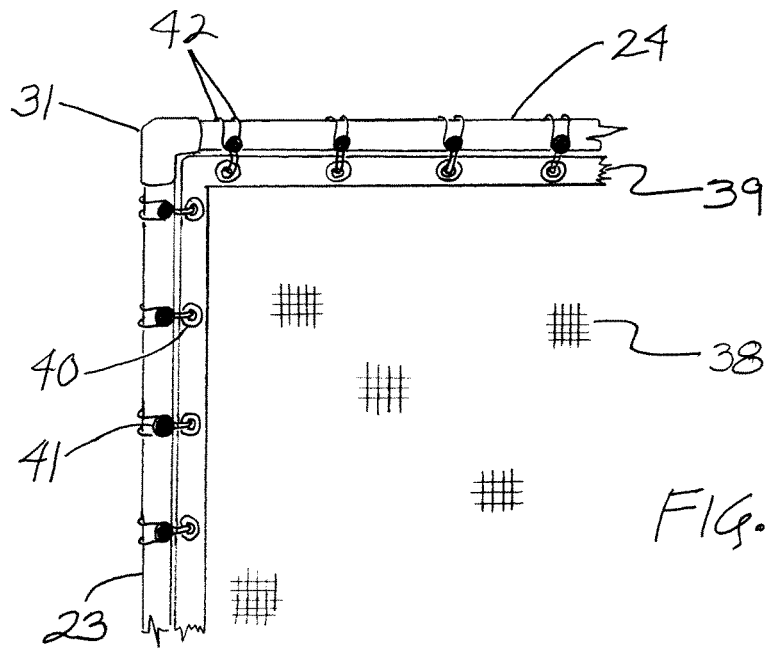
FIG. 8B depicts an elevation view of a method of suspension of a textile panel from a frame.

In the disclosed embodiments the textile panel 500 is made from a rectangular length of UV stabilized knitted polyethylene shade cloth 38 (FIG. 8B), bound at all four edges in UV-stabilized 2-¾" polypropylene or nylon binding tape 39 (FIG. 8B) using UV-stabilized thread (not shown). Brass grommets 40 (FIG. 8B) are placed at intervals along the binding.

Figure 9:
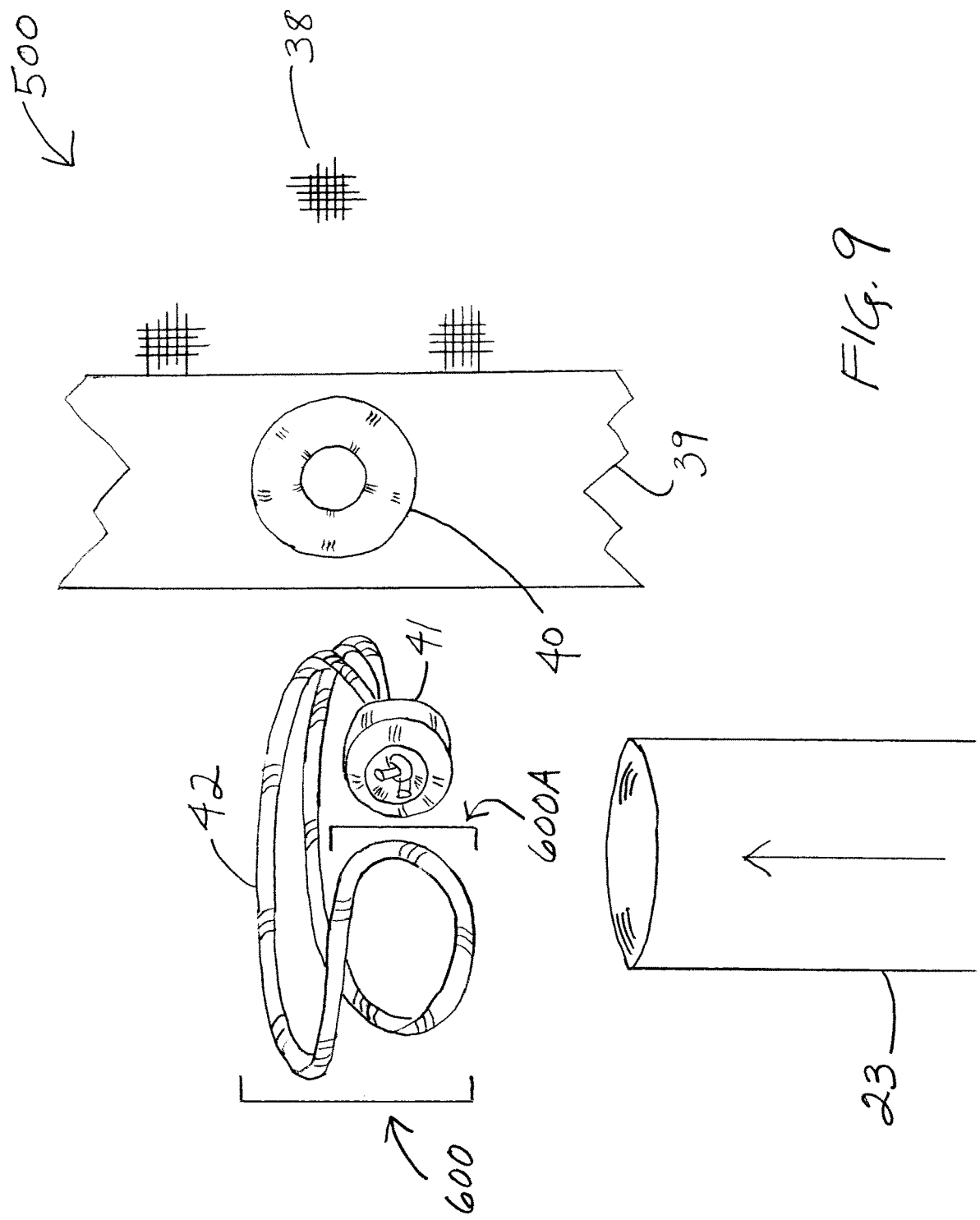
FIG. 9 depicts an exploded perspective view of a method of suspension of a textile panel from a frame.

The method of suspending, stretching, mounting, or supporting a textile panel 500 on a frame 400 may include, but is not limited to, the use of elastic cord ("bungee" cord), bungee balls 600 (FIG. 9), rings, clips, clamps, pins, hook-and-loop recloseable fastener, dual lock recloseable fastener, or any method of permitting elements of a frame 400 to pass through a component of, or any channel attached to, a textile panel 500.

Figure 8C:
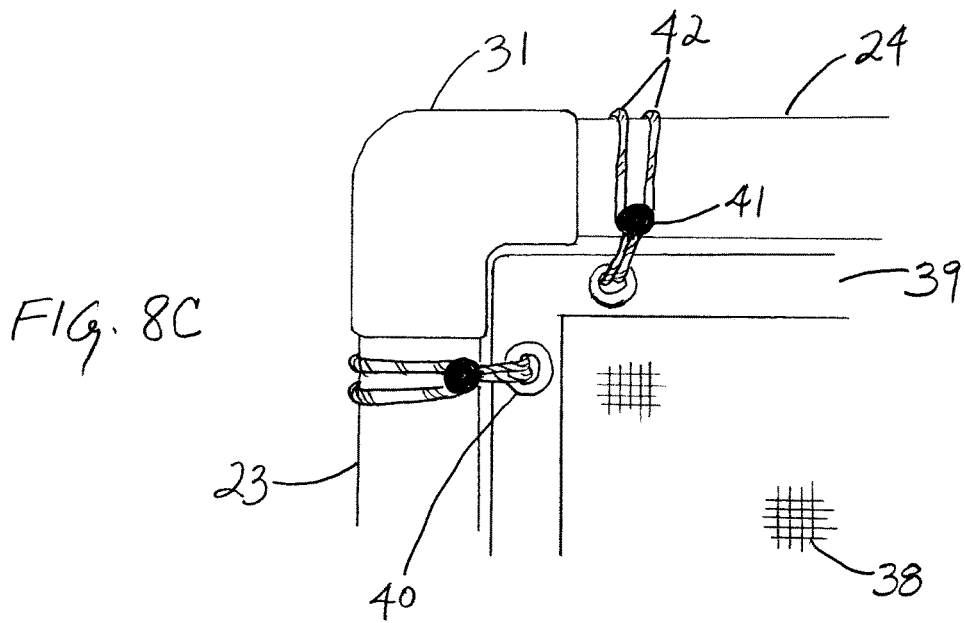
FIG. 8C depicts a close-up of a portion of FIG. 8B.

In the disclosed embodiment a textile panel 500 is suspended from a frame 400 by means of devices commonly called bungee balls 600 (FIG. 9) which consist of a length of UV-stabilized elastic cord 42 (FIGS. 8B, 8C, and 9), commonly called bungee cord, looped through a hole in a hard plastic UV-stabilized ball 41 (FIGS. 8B, 8C, and 9) and knotted so as to prevent separation of the cord 42 from the ball 41 when the cord 42 is stretched.

In order to secure a textile panel 500 to a frame 400, the loop end 600A (FIG. 9) of a bungee ball 600 is passed through a grommet 40 at an edge of said textile panel 500. Said loop end 600A is then brought around a frame element (any portion of a leg 100 or an arm 200 or a fitting and wrapped around the ball 41 of said bungee ball 600 to secure the cord 42 of said bungee ball 600 to said ball 41. Tension in said stretched cord 42 holds said textile panel 500 firmly against said frame element (leg 100 or arm 200 or fitting).

A textile panel 500 may be secured with bungee balls 600 as described to arms 200 of a frame 400 along the entire length of said panel 500. At either end of said textile panel 500, said panel 500 may be secured with bungee balls 600 as described to a leg 100 of a frame 400. If said frame 400 is configured as an enclosure, the same leg 100 may be used to secure both ends of said textile panel 500, which may meet said leg 100 from roughly opposing sides.

Should the length of a textile panel 500 be less than the length or circumference of a frame 400, multiple textile panels 500 may be secured sequentially to said frame 400 in the manner previously described to complete a barrier or enclosure.

Figure 10:
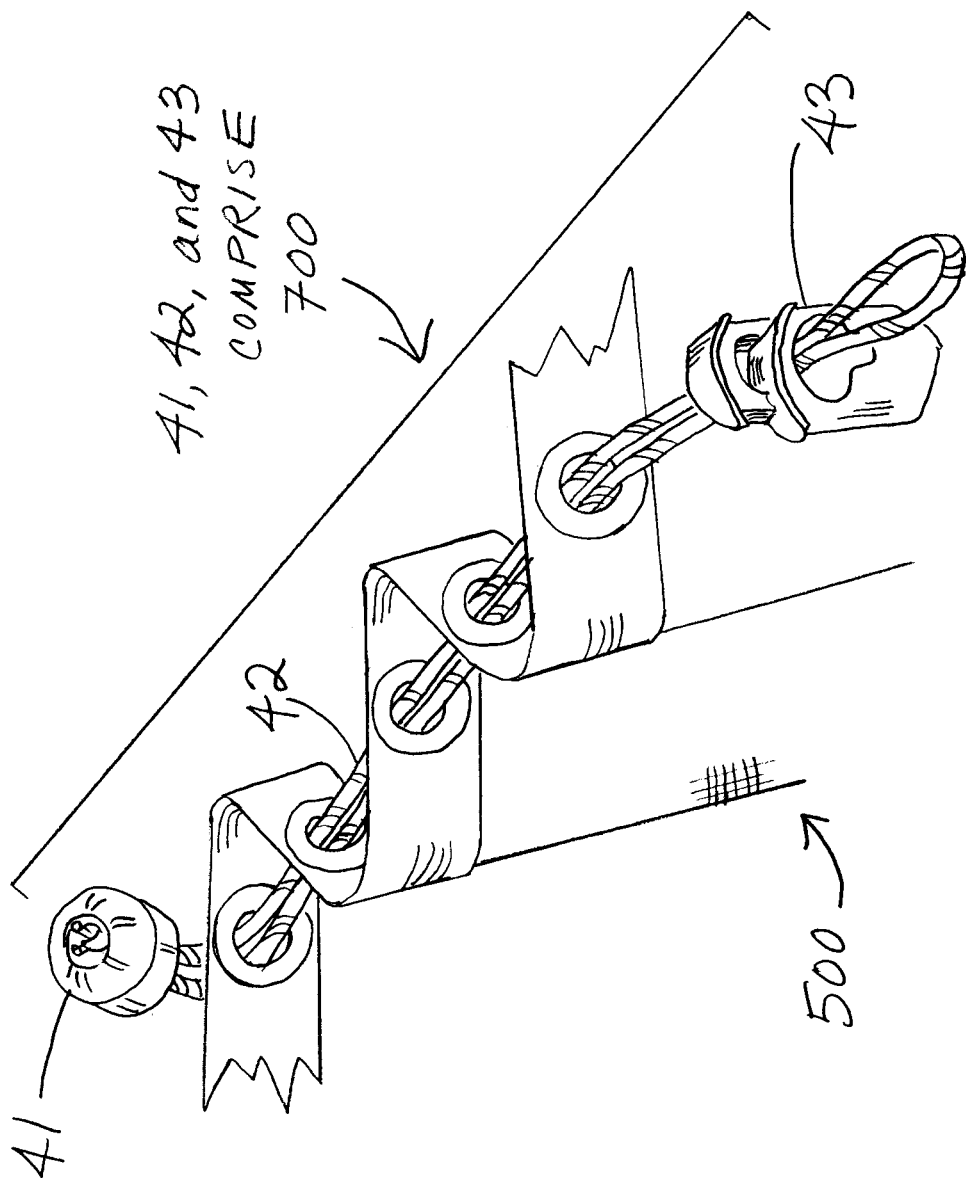
FIG. 10 depicts a perspective view of a method of gathering a textile panel.

Should the length of a textile panel 500 be greater than the length or circumference of a frame 400, various methods may permit adjusting a length or height of said textile panel 500 so as to allow it to conform to dimensions of the frame 400, such as the length, height, or circumference of said frame 400. For example, one method may employ a gathering cord 700 (FIG. 10) comprised of an elastic cord 42, a plastic ball 41, and a cord lock 43. By removing said cord lock 43 from said gathering cord 700, passing said elastic cord 42 through a series of suitably spaced grommets 40 in a binding 39 of said textile panel 500, and reinserting said elastic cord 42 through said cord lock 43, the position of said cord lock 43 may be continuously varied along the length of said elastic cord 42 so as to cause a desired degree of bunching of said textile panel 500, thereby gathering its excess length or height. The inside diameter of said grommets 40 relative to the dimensions of said ball 41 and cord lock 43 elements of said gathering cord 700 are such as to disallow the passage of either said ball 41 or said cord lock 43 through said grommets 40.

In the disclosed embodiments, a combination of friction between elements (legs 100, arms 200, and fittings) of a frame 400 and tension provided by the stretched elastic cords 42 of the bungee balls 600 that suspend a properly sized and gathered textile panel or multiple properly sized and gathered textile panels 500 from said frame 400 is sufficient to hold said frame elements (legs 100, arms 200, and fittings) together without need for glue or hardware other than that already described, although additional means may be provided to secure elements (legs 100, arms 200, and fittings) of a frame 400 to one another.

Figure 7A:
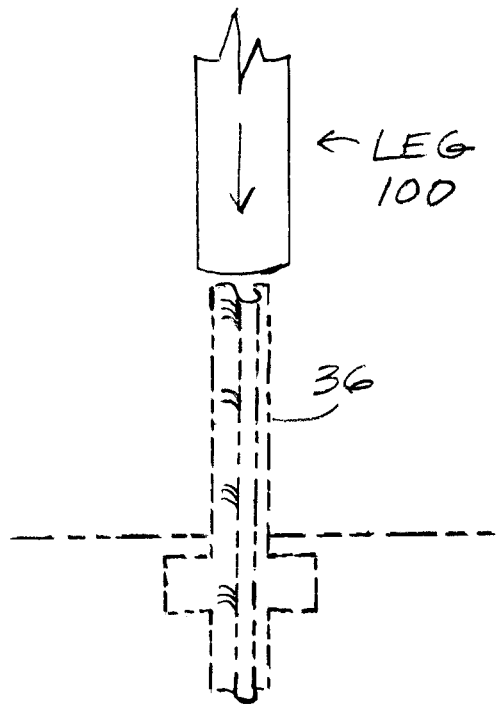
FIG. 7A depicts a perspective view of a first method of anchoring a frame.

Various methods may be used to render a frame 400 stationary so that it cannot be pushed aside or blown away under normal operating circumstances. In some embodiments, a frame may be rendered stationary by interfacing one or more legs 100 with a stabilizing or anchoring device. For example, by driving any sort of vertical stake 36 (FIG. 7A) into the ground until secure and then placing a leg 100 over said stake 36 such that, in cross-section, said leg 100 would circumscribe said stake 36, said leg 100 may be rendered stationary. By rendering at least one non-free-floating leg 100 (see definition of free-floating leg below) of a frame 400 stationary in the manner just described, one may render an entire enclosure or barrier stationary.

Figure 7B:
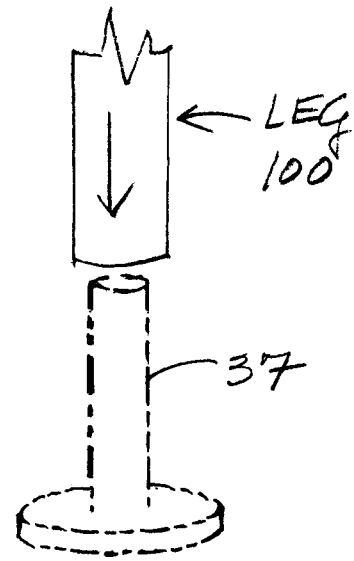
FIG. 7B depicts a perspective view of a second method of anchoring a frame.

As a second example of the various methods by which a frame 400 may be rendered stationary, one may employ a bollard-type device 37 (FIG. 7B) with a weighted base in place of each aforementioned stake 36.

Figure 7C:
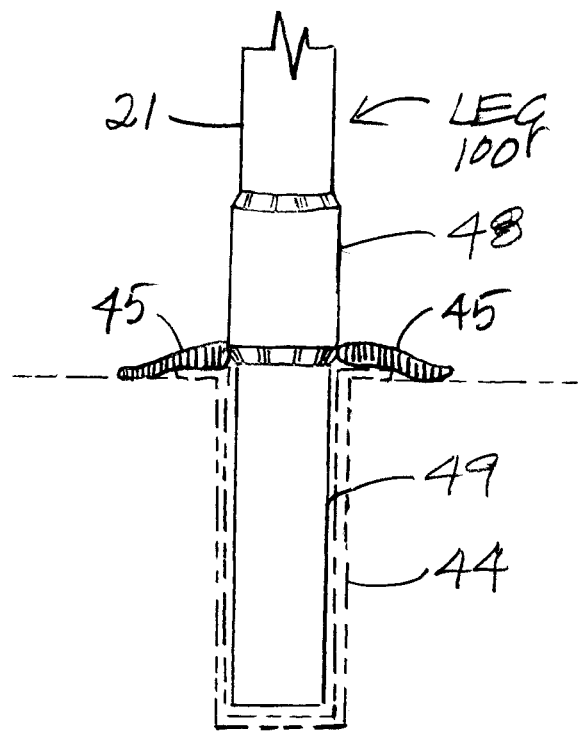
FIG. 7C depicts an elevation view of a third method of anchoring a frame.
Figure 7D:
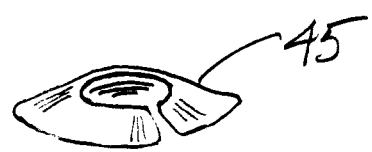
FIG. 7D depicts a perspective view of an accessory gasket.

As a third example of the various methods by which a frame 400 may be rendered stationary, one may add to the bottom of a leg element 23 (if said leg is configured as in FIG. 1A) or 21 (if said leg is configured as in FIG. 1B) a leg extension comprised of a suitably sized outside couple 28 or 48 (FIG. 7C), respectively, and an additional span of tubing 26 or 49 (FIG. 7C), said additional span of tubing 26 or 49 being of indeterminate length and being cut to length as necessary and then inserted into a ground sleeve 44 (FIG. 7C). A split flexible gasket 45 (FIGS. 7C and 7D) may be installed around the base of each leg 100 configured with an extension where its extension enters the ground sleeve 44 at grade as an example of one of the various methods by which snow, water, and other liquid and solid materials may be prevented from entering the ground sleeve 44.

Should a leg 100 of a frame 400 need to be positioned in a location where it is neither possible to have a supporting stake 36 nor a bollard 37 nor a ground sleeve 44, it may be possible to render said leg 100 free floating. A free-floating leg (FIG. 5) is defined as a leg 100 that is not held stationary by a stake or bollard or other object that passes through or occupies a portion of the internal volume of or otherwise provides support to said leg 100 or by a ground sleeve 44 into which said leg 100 or an extension or support thereof is inserted.

For example, a free-floating leg 100 may be configured in such a manner as to distribute its load laterally to other frame elements. One of the various methods of accomplishing this is by allowing the bottom end 23B of a leg element 23 of a free-floating leg 100 to be accepted by a 3-way fitting (for example, a 3-way variable-angle tee 32), the other connection points of said fitting accepting arms 200 that extend to non-free-floating legs 100 adjacent to the free-floating leg, the bottom leg element 23 of each said adjacent leg 100 being configured with a suitable fitting such as a standard tee 33 such that a second connection point of the standard tee 33 accepts the second end of said arm 200 that extends to it and the third connection point of the standard tee 33 accepts a short section of pipe such as a span of tubing 26 cut to the needed length. Said arms 200 may be supported at locations near the free-floating leg 100 by snap clamps 35 (FIGS. 5 and 6K), each snap clamp accepting a span of tubing 26 cut to the needed length and sealed with a cap 46 (FIGS. 5 and 6K) that rests on the ground.

Although this patent application illustrates and describes disclosed embodiments and specific variations thereof, it will be readily apparent to those of ordinary skill in the art that other embodiments and examples may perform similar functions and/or achieve like results. All such equivalent embodiments and examples are within the spirit and scope of the disclosed embodiments, are contemplated thereby, and are intended to be covered by the following claims.

It is noted that the embodiments described herein can be used individually or in any combination thereof. Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. An expandable, configurable, disassemblable structure, comprising:
   a plurality of interconnected frame assemblies, each frame assembly comprising:
   an arm member having a first and second end and extending horizontally;
   a leg member having a variable height, a first end, and a second end with no connection to another leg member second end, providing conformity to irregular surface contours;
   a first fitting connecting the first end of the arm member and the first end of the leg member at an angle;
   an adjustable panel fastened to the arm member and a leg member of at least one of the interconnected frame assemblies; and
   a gathering device for adjusting the adjustable panel in length or height;
   wherein the plurality of interconnected frame assemblies form an enclosure closing back on itself wherein the first fitting further connects a second end of an arm member of a preceding one of the interconnected frame assemblies to the first end of the arm member and the first end of the leg member at an angle;

or wherein the plurality of interconnected frame assemblies form a barrier wherein a second fitting of an end frame assembly connects a second end of an arm member of the end frame assembly to a terminating leg member such that a first one of the interconnected frame assemblies and the end frame assembly are not directly connected.

2. The structure of claim 1, wherein one or more of the arm and leg members comprise a telescopic member.

3. The structure of claim 2, wherein the telescopic member comprises a first tubing span and a second tubing span with an outside diameter smaller than an inside diameter of the first tubing span.

4. The structure of claim 3, wherein the second tubing span is secured within the first tubing span.

5. The structure of claim 1, further comprising:
a stake circumscribed by or otherwise interfacing with the second end of the leg member for insertion into a ground surface for rendering the leg member stationary;
a bollard with a weighted base circumscribed by or otherwise interfacing with the second end of the leg member for rendering the leg member stationary; or
a ground sleeve for insertion into a ground surface, into which the second end of the leg member, an extension thereof, or a stake circumscribed by or otherwise interfacing with the second end of the leg member may be inserted for rendering the leg member stationary.

6. The structure of claim 1, wherein the first fitting comprises a variable angle 3-way tee, a standard right angle elbow, a standard tee, or an offset tee.

7. The structure of claim 1, wherein the adjustable panel comprises a customizable UV-stabilized knitted polyethylene material.

8. The structure of claim 1, wherein the adjustable panel comprises UV-stabilized binding tape bound around a perimeter of the adjustable panel with UV-stabilized thread and a plurality of UV-stabilized elastic cords looped through grommets in the binding tape and around the arm members and at least one leg member.

9. The structure of claim 8, wherein the gathering device comprises a gathering cord passing through the grommets for adjusting a length or height of the adjustable panel.

10. A method of building an expandable, configurable, disassemblable structure, comprising:
assembling a plurality of interconnected frame assemblies, each frame assembly comprising:
an arm member having a first and second end and extending horizontally;
a leg member having a variable height, a first end, and a second end with no connection to another leg member second end, providing conformity to irregular surface contours;
a first fitting connecting the first end of the arm member and the first end of the leg member at an angle;
an adjustable panel fastened to the arm member and a leg member of at least one of the interconnected frame assemblies; and
a gathering device for adjusting the adjustable panel in length or height; and
forming the plurality of interconnected frame assemblies into an enclosure closing back on itself by using the first fitting to further connect a second end of an arm member of a preceding one of the interconnected frame assemblies to the first end of the arm member and the first end of the leg member at an angle;

or forming the plurality of interconnected frame assemblies into a barrier by using a second fitting of an end frame assembly to connect a second end of an arm member of the end frame assembly to a terminating leg member such that a first one of the interconnected frame assemblies and the end frame assembly are not directly connected.

11. The method of claim 10, wherein one or more of the arm and leg members comprise a telescopic member with a first tubing span and a second tubing span with an outside diameter smaller than an inside diameter of the first tubing span, the method comprising securing the second tubing span within the first tubing span.

12. The method of claim 10, comprising:
using the second end of the leg member to circumscribe or otherwise interface with a stake for insertion into a ground surface for rendering the leg member stationary;
using the second end of the leg member to circumscribe or otherwise interface with a bollard with a weighted base for rendering the leg member stationary; or
inserting the second end of the leg member, or an extension thereof, or a stake circumscribed by or otherwise interfacing with the second end of the leg member into a ground sleeve for insertion into a ground surface for rendering the leg member stationary.

13. The method of claim 10, wherein the adjustable panel comprises a customizable UV-stabilized knitted polyethylene material.

14. The method of claim 10, wherein the adjustable panel comprises UV-stabilized binding tape bound around a perimeter of the adjustable panel with UV-stabilized thread, and the method further comprises fastening the adjustable panel to the arm members and at least one leg member by looping a plurality of UV-stabilized elastic cords through grommets in the binding tape and around the arm members and the at least one leg member.

15. The method of claim 10, wherein the gathering device comprises a gathering cord passing through the grommets for adjusting a length or height of the adjustable panel.

\* \* \* \* \*